(12) United States Patent
Yagi et al.

(10) Patent No.: US 9,868,847 B2
(45) Date of Patent: Jan. 16, 2018

(54) RUBBER COMPOSITION AND TIRE PRODUCED BY USING THE SAME

(75) Inventors: Reiko Yagi, Kodaira (JP); Kumi Fujiki, Kodaira (JP); Tetsuo Takano, Wakayama (JP); Masaaki Tsuchihashi, Wakayama (JP)

(73) Assignees: BRIDGESTONE CORPORATION, Tokyo (JP); KAO CORPORATION, Tokyo (JP)

(*) Notice: Subject to any disclaimer, the term of this patent is extended or adjusted under 35 U.S.C. 154(b) by 179 days.

(21) Appl. No.: 13/989,243

(22) PCT Filed: Nov. 24, 2011

(86) PCT No.: PCT/JP2011/077081
§ 371 (c)(1),
(2), (4) Date: Aug. 9, 2013

(87) PCT Pub. No.: WO2012/070626
PCT Pub. Date: May 31, 2012

(65) Prior Publication Data
US 2013/0317151 A1    Nov. 28, 2013

(30) Foreign Application Priority Data
Nov. 24, 2010  (JP) ................................ 2010-261375

(51) Int. Cl.
| B60C 1/00 | (2006.01) |
| C08K 5/20 | (2006.01) |
| C08K 3/36 | (2006.01) |
| C08K 5/548 | (2006.01) |
| C08L 7/00 | (2006.01) |
| C08L 9/00 | (2006.01) |
| C08L 21/00 | (2006.01) |

(52) U.S. Cl.
CPC .................. *C08K 5/20* (2013.01); *B60C 1/00* (2013.01); *C08K 3/36* (2013.01); *C08K 5/548* (2013.01); *C08L 7/00* (2013.01); *C08L 9/00* (2013.01); *C08L 21/00* (2013.01)

(58) Field of Classification Search
CPC .. C08K 3/36; C08K 5/548; C08K 5/20; C08L 7/00; C08L 21/00; C08L 9/00; B60C 1/00
USPC ................................. 524/224, 223
See application file for complete search history.

(56) References Cited

U.S. PATENT DOCUMENTS

| 6,559,209 | B1 | 5/2003 | Araki et al. | |
| 6,590,017 | B1 * | 7/2003 | Hergenrother et al. | ...... 524/210 |
| 2002/0177641 | A1 * | 11/2002 | Ezawa et al. | ............... 524/191 |
| 2005/0171251 | A1 * | 8/2005 | Nakajima | ............. C08L 95/00 |
| | | | | 524/59 |

FOREIGN PATENT DOCUMENTS

| JP | 58-113235 A | 7/1983 |
| JP | 2-35929 A | 2/1990 |
| JP | 7-33912 A | 2/1995 |
| JP | 10-237408 A | 9/1998 |
| JP | 2003/020406 | * 1/2003 |
| JP | 2003-20406 A | 1/2003 |
| JP | 2003-533574 A | 11/2003 |
| JP | 2004-131572 A | 4/2004 |
| JP | 2007/277411 | * 10/2007 |
| JP | 2007-277411 A | 10/2007 |
| JP | 2009-126881 A | 6/2009 |
| JP | 2009-291731 A | 12/2009 |
| JP | 2010-59272 A | 3/2010 |
| WO | 0188027 A1 | 11/2001 |

OTHER PUBLICATIONS

Machine translation, JP 2007/277411.*
Machine translation for JP2003/020406.*
International Search Report for PCT/JP2011/077081 dated Feb. 28, 2012.
International Preliminary Report on Patentability and Written Opinion dated Jun. 20, 2013 in International Application No. PCT/JP2011/077081.
Communication dated May 31, 2016 from the European Patent Office in counterpart application No. 11842486.0.
Boze, Handbook of Detergents—Part A: Properties, Jan. 1, 1999, Marcel Dekker, Inc., New York, Basel, pp. 35-36.

* cited by examiner

*Primary Examiner* — Angela C Scott
(74) *Attorney, Agent, or Firm* — Sughrue Mion, PLLC

(57) ABSTRACT

In order to provide a rubber composition which is improved in dispersibility of silica in rubber compositions and can be improved as well in heat build-up and processability without causing increasing a viscosity of unvulcanized rubber and retarding a vulcanization rate, and a tire prepared by using the same, the rubber composition is endowed with a constitution in which at least one rubber component selected from natural rubber and/or diene base synthetic rubbers is compounded with a white filler and at least one of monoalkanolamides represented by the following Formula (I):

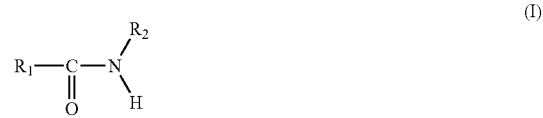

(I)

[in Formula (I) described above, $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit].

17 Claims, No Drawings

RUBBER COMPOSITION AND TIRE PRODUCED BY USING THE SAME

CROSS REFERENCE TO RELATED APPLICATIONS

This application is a National Stage of International Application No. PCT/JP2011/077081 filed Nov. 24, 2011, claiming priority based on Japanese Patent Application No. 2010-261375 filed Nov. 24, 2010, the contents of all of which are incorporated herein by reference in their entirety.

TECHNICAL FIELD

The present invention relates to a rubber composition and a tire produced by using the same, more specifically to a rubber composition which is improved in dispersibility of silica in rubber compositions and can be improved as well in heat build-up and processability without causing increasing a viscosity of unvulcanized rubber and retarding a vulcanization rate, a tire prepared by using the rubber composition, and a method of reducing a viscosity of unvulcanized rubber.

BACKGROUND ART

In accordance with social demands to energy saving in recent years, silica is compounded and used so frequently as a filler which causes low heat build-up of a rubber composition for tires to be consistent with a grip performance of a tire on a wet road surface for the purpose of saving fuel consumption of automobiles.

Silica used tends to cause aggregation of particles themselves by virtue of hydrogen bond of a silanol group which is a surface functional group, and in order to improve dispersibility of silica in rubber, a kneading time has to be extended. Also, there have been the defects that a silica-compounded rubber composition is elevated in a Mooney viscosity due to insufficient dispersibility of silica in rubber and is inferior in processability such as extrusion. Further, the surface of silica particles is acidic, and therefore silica involves the defects that it adsorbs basic substances which are used as a vulcanization accelerator to prevent the rubber composition from being sufficiently vulcanized and that the storage modulus of the rubber composition is not enhanced. Accordingly, silica-compounded rubber compositions have so far been desired to be improved in processability and the like.

1) A technology in which amide compounds (fatty acid amides) having a polar end showing a weak chemical reactivity to silica and a non-polar end showing a weak chemical reactivity to elastic polymers are added to silica-compounded rubber as a processing aid for enhancing dispersibility of a reinforcing silica filler in a rubber composition (refer to, for example, patent document 1), and 2) a technology in which tertiary amine compounds are added to silica-compounded rubber to thereby improve dispersibility of silica (refer to, for example, patent document 2) have so far been known as technologies for improving processability and the like in a silica-compounded rubber composition.

It is described in the foregoing patent document 1 that amide compounds (fatty acid amides) having structures which are different from those of the compounds used in the present invention are added to silica-compounded rubber to thereby improve processability thereof, but the problem that the vulcanization rate is delayed is involved therein. Also, it is described in the foregoing patent document 2 that tertiary amine compounds having structures which are different from those of the compounds used in the present invention is added to silica-blended rubber to thereby improve processability thereof, but in this case, the problem that scorch time is expedited to bring about rubber burning is involved therein.

On the other hand, known are sulfur blooming inhibitors for rubber comprising specific alkanolamide compounds and a technology for compounding the sulfur blooming inhibitors with rubber compositions (refer to, for example, patent document 3). However, improvement in the processability in compounding silica is not described therein, and the invention is different in the subjects of the invention, use applications and a technical concept from the present invention.

PRIOR ART DOCUMENTS

Patent Documents

Patent document 1: Publication of Japanese Translation of PCT International Publication Application No. 2003-533574 (claims, examples and others)

Patent document 2: Japanese Patent Application Laid-Open No. 2010-59272 (claims, examples and others)

Patent document 3: Japanese Patent Application Laid-Open Sho 58 No. 113235 (claims, examples and others)

OUTLINE OF THE INVENTION

Problems to be Solved by the Invention

The present invention intends to solve the conventional problems described above, and an object thereof is to provide a rubber composition which is improved in dispersibility of silica in the rubber composition and can be improved as well in heat build-up and processability without causing increasing a viscosity of unvulcanized rubber and retarding a vulcanization rate, a tire prepared by using the rubber composition, and a method of reducing a viscosity of unvulcanized rubber.

Means for Solving the Problems

In light of the conventional problems described above, intense investigations repeated by the present inventors have resulted in finding that a rubber composition which meets the object described above and a tire prepared by using the same are obtained by compounding at least one rubber component selected from natural rubber and/or diene base synthetic rubbers with a white filler and at least one of specific monoalkanolamides, and thus, the present invention has come to be completed.

That is, the present invention comprises the following items (1) to (10).

(1) A rubber composition prepared by compounding at least one rubber component selected from natural rubber and/or diene base synthetic rubbers with a white filler and at least one of monoalkanolamides represented by the following Formula (I):

[in Formula (I) described above, $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit].

(2) A rubber composition prepared by compounding at least one rubber component selected from natural rubber and/or diene base synthetic rubbers with a white filler and at least one of monoalkanolamides represented by the following Formula (I):

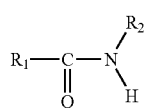

(I)

[in Formulas (I) described above, $R_1$ represents methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl; and $R_2$ is a hydroxyalkyl group or a hydroxyalkyl group having an oxyalkylene unit].

(3) The rubber composition as described in the above item (1) or (2), wherein 5 to 200 parts by mass of the white filler and 0.5 to 15 parts by mass of the monoalkanolamide represented by Formula (I) are compounded based on 100 parts by mass of the rubber component.

(4) The rubber composition as described in any one of the above items (1) to (3), wherein $R_2$ in Formulas (I) described above is represented by the following Formula (II); $R_3$ is an alkylene group having 1 to 6 carbon atoms; and n is a number of 1 to 5:

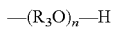

$$-(R_3O)_n-H \qquad (II)$$

(5) The rubber composition as described in any one of the above items (1) to (4), wherein it is further blended with a silane coupling agent.

(6) The rubber composition as described in the above item (5), wherein a compounding amount of the silane coupling agent is 1 to 20 parts by mass based on 100 parts by mass of silica.

(7) The rubber composition as described in any one of the above items (1) to (6), wherein a compounding amount of the monoalkanolamide represented by Formula (I) is 0.5 to 20 parts by mass based on 100 parts by mass of the white filler.

(8) A tire prepared by using the rubber composition as described in any one of the above items (1) to (7) for a tire member.

(9) A method of reducing a viscosity of unvulcanized rubber, wherein at least one rubber component selected from natural rubber and/or diene base synthetic rubbers is compounded with a white filler and at least one of monoalkanolamides represented by the following Formula (I):

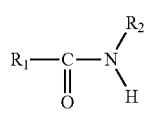

(I)

[in Formula (I) described above, $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit].

(10) A method of reducing a viscosity of unvulcanized rubber, wherein at least one rubber component selected from natural rubber and/or diene base synthetic rubbers is compounded with a white filler and at least one of monoalkanolamides represented by the following Formula (I):

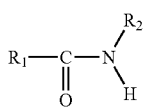

(I)

[in Formula (I) described above, $R_1$ represents methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl; and $R_2$ is a hydroxyalkyl group or a hydroxyalkyl group having an oxyalkylene unit].

Effects of the Invention

According to the present invention, provided are a rubber composition which is improved in dispersibility of silica and can be improved as well in heat build-up and processability without causing increasing a viscosity of unvulcanized rubber and retarding a vulcanization rate, a tire prepared by using the rubber composition, and a method of reducing a viscosity of unvulcanized rubber.

Mode for Carrying Out the Invention

The embodiment of the present invention shall be explained below in detail.

The rubber composition of the present invention is prepared by compounding or blending at least one rubber component selected from natural rubber and/or diene base synthetic rubbers with a white filler and at least one of monoalkanolamides represented by the following Formula (I):

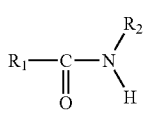

(I)

[in Formula (I) described above, $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit] and prepared by compounding or blending at least one rubber component selected from natural rubber and/or diene base synthetic rubbers with a white filler and at least one of monoalkanolamides represented by the following Formula (I):

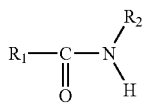

[in Formula (I) described above, $R_1$ represents methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl; and $R_2$ is a hydroxyalkyl group or a hydroxyalkyl group having an oxyalkylene unit].

The rubber composition of the present invention shall be described below, and the method of reducing a viscosity of unvulcanized rubber according to the present invention shall be described as well.

The rubber component used for the rubber composition of the present invention comprises natural rubber and/or a diene base synthetic rubber. In this connection, the diene base synthetic rubber includes polyisoprene rubber (IR), polybutadiene rubber (BR), styrene-butadiene copolymer rubber (SBR), butyl rubber (IIR), ethylene-propylene copolymers and the like. The rubber components may be used alone or in a blend of two or more kinds thereof.

The white filler used for the rubber composition of the present invention includes silica, aluminum hydroxide, alumina, clay, calcium carbonate and the like, and among them, it is preferably silica and aluminum hydroxide, particularly preferably silica from the viewpoint of the reinforcing property.

Silica which can be used shall not specifically be restricted, and commercial products used for rubber compositions can be used. Among them, wet silica (hydrated silica), dry silica (anhydrous silica), colloidal silica and the like can be used, and wet silica is particularly preferably used.

A compounding amount or a content of the white fillers falls in a range of preferably 5 to 200 parts by mass, more preferably 10 to 150 parts by mass and further more preferably 20 to 120 parts by mass based on 100 parts by mass of the rubber component described above. Particularly in a case of the present invention, the effects of the present invention can be exerted even when a compounding amount of silica is as high as 60 parts by mass or more based on 100 parts by mass of the rubber component described above.

A compounding amount or a content of the white filler is preferably 5 parts by mass or more based on 100 parts by mass of the rubber component described above from the viewpoint of lowering the hysteresis. On the other hand, it is preferably 200 parts by mass or less from the viewpoint of improving the workability.

When silica is used as the white filler, a silane coupling agent is preferably used from the viewpoint of the reinforcing property.

The silane coupling agent which can be used shall not specifically be restricted and includes, for example, at least one of bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltriethoxysilane, 3-mercaptopropyltrimethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N -dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethylthiocarbamoyl tetrasulfide, dimethoxymethylsilylpropylbenzothiazole tetrasulfide and the like.

A compounding amount or a content of the silane coupling agents falls, though varied according to a compounding amount or a content of silica, in a range of preferably 1 to 20 parts by mass based on 100 parts by mass of silica, and from the viewpoint of the heat build-up, it falls in a range of more preferably 6 to 12 parts by mass.

A compounding amount or a content of the silane coupling agent is preferably 1 part by mass or more based on 100 parts by mass of silica from the viewpoint of the effect of adding the silane coupling agent. On the other hand, it is preferably 20 parts by mass or less from the viewpoint of maintaining the reinforcing property and the heat build-up.

In the present invention, carbon black can be used in combination as a reinforcing filler in addition to the white filler described above.

The carbon black which can be used shall not specifically be restricted, and one in the grades of, for example, FEF, SRF, HAF, ISAF, SAF and the like can be used.

A compounding amount or a content of the carbon black shall not specifically be restricted as well, and it is preferably 0 to 60 parts by mass, more preferably 10 to 50 parts by mass based on 100 parts by mass of the rubber component described above. It is preferably 60 parts by mass or less from the viewpoint of maintaining the heat build-up.

The monoalkanolamide represented by the following Formula (I) which is used in the present invention is compounded in order to lower an unvulcanization viscosity of the silica-compounded rubber and improve processability thereof to exert the effects of the present invention:

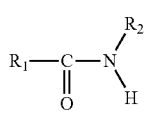

[in Formula (I) described above, $R_1$ represents an alkyl group or an alkenyl group having 1 to 13 carbon atoms, and the above alkyl group and alkenyl group may be any of a linear type, a branched type and a cyclic type; and $R_2$ represents a hydroxyalkyl group or a hydroxyalkyl group having an oxyalkylene unit].

In Formula (I) described above, $R_1$ is an alkyl group or an alkenyl group having 1 to 13 carbon atoms from the viewpoints of reduction of the unvulcanization viscosity, the scorch time and tan δ, and the alkyl group and alkenyl group may be any of a linear type, a branched type and a cyclic type. It includes, for example, an alkyl group such as methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl and isotridecyl, and an alkenyl group such as allyl, 3-butenyl, methallyl, 2-methyl-3-butenyl, 3-methyl-3-butenyl, 1,1-dimethyl-2-propenyl and 4-pentenyl. In order to further exert the effects of the present invention, $R_1$ is an alkyl group or an alkenyl group having preferably 6 to 13 carbon atoms, more preferably 11 to 13 carbon atoms and further more preferably 11 carbon atoms, and the alkyl group and alkenyl group may be any of a linear type, a branched type and a cyclic type. It is preferably heptyl, 2-ethylhexyl, nonyl, undecyl and tridecyl, more preferably undecyl and tridecyl and further more preferably undecyl. Fatty acid which is a raw material of the monoalkanolamide includes preferably octanoic acid, lauric acid, tetradecanoic acid, myristic acid and the like.

In the present invention, $R_1$ is limited, as described above, to an alkyl group or an alkenyl group having 1 to 13 carbon atoms, preferably 6 to 13 carbon atoms and more preferably 11 to 13 carbon atoms since the alkyl group or the alkenyl group having carbon atoms exceeding 13 tends to cause the rubber component to exert the lower effects of the present invention as compared with an alkyl group or an alkenyl group having 1 to 13 carbon atoms.

In Formula (I), $R_2$ is a hydroxyalkyl group or a hydroxyalkyl group having an oxyalkylene unit. The alkyl group described above is a linear or branched alkyl group having preferably 1 to 6 carbon atoms, more preferably 2 to 3 carbon atoms.

Further, $R_2$ in Formula (I) described above is preferably represented by the following Formula (II); $R_3$ is an alkylene group having 1 to 6 carbon atoms; and n is preferably a number of 1 to 5:

$$—(R_3O)_n—H \quad\quad (II)$$

Above all, $R_3$ is preferably ethylene or propylene, and n is a number of preferably 1 to 3, more preferably 1. Further preferably, $R_3$ is ethylene, and n is 1. N numbers of $R_3$ may be same or different.

The monoalkanolamide represented by Formula (I) described above which can specifically be used includes at least one of octanoic acid monoethanolamide, octanoic acid monoisopropanepropanolamide, POE (2) octanoic acid monoethanolamide, lauric acid monoethanolamide, lauric acid monoisopropanolamide, hexanoic acid monoethanolamide, octanoic acid monoethanolamide, tetradecanoic acid monoethanolamide and POE (2) lauric acid monoethanolamide. Among them, preferably used are lauric acid monoisopropanolamide, hexanoic acid monoethanolamide, octanoic acid monoethanolamide, decanoic acid monoethanolamide, lauric acid monoethanolamide, tetradecanoic acid monoethanolamide and POE (2) lauric acid monoethanolamide. Herein, POE (2) refers to —$(C_2H_4O)_2$—. A synthetic process for the monoalkanolamide represented by Formula (I) described above is known, and it can be obtained by various production processes. Also, commercial products may be used.

A compounding amount or a content of the monoalkanolamides is preferably 0.5 to 15 parts by mass based on 100 parts by mass of the rubber component, and it is more preferably 1 to 10 parts by mass, more preferably 2 to 10 parts by mass and further more preferably 3 to 10 parts by mass from the viewpoint of further exerting the effects of the present invention. Also, a compounding amount or a content of the monoalkanolamide is preferably 0.5 to 20 parts by mass, more preferably 1 to 15 parts by mass and further more preferably 2 to 12 parts by mass based on 100 parts by mass of the white filler.

When a compounding amount or a content of the monoalkanolamide is 0.5 part by mass or more based on 100 parts by mass of the rubber component, the effect of reducing the unvulcanization viscosity is high. On the other hand, when it is 15 parts by mass or less, a smaller influence is exerted on the vulcanization rate, and the range is preferred.

In addition to the rubber component, the white filler and the monoalkanolamide represented by Formula (I) each described above, compounding ingredients which are usually used in the rubber industry can be compounded to the rubber composition of the present invention, as long as the objects of the present invention are not damaged. They are suitably selected from, for example, antioxidants, softening agents, stearic acid, zinc oxide, vulcanization accelerators, vulcanization accelerator activators, vulcanizing agents and the like. Commercial products can suitably be used as the compounding ingredients.

The rubber composition of the present invention can be obtained by kneading, warming up and extruding the rubber component, the white filler, the monoalkanolamide described above and, if necessary, various compounding ingredients suitably selected by means of a kneading machine such as a roll and an internal mixer. After mold processing, the rubber composition is vulcanized and can be used for applications of tire members, such as tire treads, under treads, carcasses, side walls and bead parts, and in addition thereto, it can be used as well for applications of industrial products such as rubber vibration insulators, belts, hoses and others.

The reasons why the rubber composition thus constituted is improved in dispersibility of silica and can be improved as well in a heat build-up and processability without causing increasing a viscosity of unvulcanized rubber and retarding a vulcanization rate are presumed as follows.

That is, it is presumed that in the rubber composition of the present invention, when at least one of the monoalkanolamides represented by Formula (I) is compounded with a mixture prepared by mixing at least one rubber component selected from natural rubber and/or diene base synthetic rubbers with silica which is the white filler, the surface of silica is hydrophobized, whereby silica is inhibited from being aggregated each other to improve the processability. The monoalkanolamide has a higher hydrophobization effect on the surface of silica than that of fatty acid amides, tertiary amines and the like and improves the processability more than those compounds.

Next, the tire of the present invention is produced by a usual process using the rubber composition of the present invention. That is, the rubber composition of the present invention in which the various compounding ingredients are compounded, if necessary, as described above is extruded into a tire member, for example, a member for a tread at an unvulcanized stage, and the member is stuck on a tire under processing on a tire-molding machine by a usual method, whereby a green tire is molded. The green tire is heated and pressed in a vulcanizing machine to obtain a tire. Since the tire of the present invention thus obtained is excellent in low heat build-up, it is excellent in low fuel consumption, and it is excellent as well in productivity because of good processability of the above rubber composition.

Further, in the method of reducing a viscosity of unvulcanized rubber according to the present invention, the surface of silica is hydrophobized by compounding at least one rubber component selected from natural rubber and/or diene base synthetic rubbers with the white filler and at least one of the monoalkanolamides represented by Formula (I), whereby silica itself is inhibited from being aggregated to reduce a viscosity of the unvulcanized rubber.

The present invention further discloses the following compositions and processes in the embodiment described above.

[1] A rubber composition prepared by compounding at least one rubber component selected from natural rubber and/or diene base synthetic rubbers with a white filler and at least one of monoalkanolamides represented by the following Formula (I):

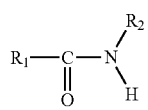
(I)

[in Formula (I) described above, $R_1$ represents an alkyl group or an alkenyl group having 1 to 13 carbon atoms, preferably 6 to 13 carbon atoms, more preferably 11 to 13 carbon atoms and further more preferably 11 carbon atoms, and the alkyl group and alkenyl group may be any of a linear type, a branched type and a cyclic type; and $R_2$ represents a hydroxyalkyl group or a hydroxyalkyl group having an oxyalkylene unit].

[2] A rubber composition prepared by compounding at least one rubber component selected from natural rubber and/or diene base synthetic rubbers with a white filler and at least one of monoalkanolamides represented by the following Formula (I):

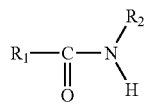
(I)

[in Formulas (1) described above, $R_1$ represents methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl, preferably heptyl, 2-ethylhexyl, nonyl, undecyl or tridecyl, more preferably undecyl or tridecyl and further more preferably undecyl; and $R_2$ is a hydroxyalkyl group or a hydroxyalkyl group having an oxyalkylene unit].

[3] The rubber composition as described in the above item [1] or (2), wherein 100 parts by mass of the rubber component is compounded or blended with 5 to 200 parts by mass, preferably 10 to 150 parts by mass and more preferably 20 to 120 parts by mass of the white filler.

[4] The rubber composition as described in any one of the above items [1] to [3], wherein 100 parts by mass of the rubber component is compounded or blended with 0.5 to 15 parts by mass, preferably 1 to 10 parts by mass, more preferably 2 to 10 parts by mass and further more preferably 3 to 10 parts by mass of the monoalkanolamide represented by Formula (I) described above.

[5] The rubber composition as described in any one of the above items [1] to [4], wherein $R_2$ in Formula (I) described above is represented by the following Formula (II); $R_3$ is an alkylene group having 1 to 6 carbon atoms, and n is a number of 1 to 5; preferably, $R_3$ is ethylene or propylene, and n is a number of 1 to 3; more preferably, $R_3$ is ethylene, and n is a number of 1:

$$—(R_3O)_n—H \qquad (II)$$

[6] The rubber composition as described in any one of the above items [1] to [5], wherein it is further compounded with a silane coupling agent.

[7] The rubber composition as described in the above item [6], wherein a compounding amount or a content of the silane coupling agent is 1 to 20 parts by mass, preferably 6 to 12 parts by mass based on 100 parts by mass of silica.

[8] The rubber composition as described in any one of the above items [1] to [7], wherein a compounding amount or a content of the monoalkanolamide represented by Formula (I) is 0.5 to 20 parts by mass, preferably 1 to 15 parts by mass and more preferably 2 to 12 parts by mass based on 100 parts by mass of the white filler.

[9] A tire prepared by using the rubber composition as described in any one of the above items [1] to [8] for a tire member.

[10] A method of reducing a viscosity of unvulcanized rubber, wherein at least one rubber component selected from natural rubber and/or diene base synthetic rubbers is compounded with a white filler and at least one of monoalkanolamides represented by the following Formula (I):

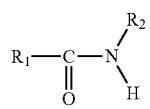
(I)

[in Formula (I) described above, $R_1$ represents an alkyl group or an alkenyl group having 1 to 13 carbon atoms, preferably 6 to 13 carbon atoms, more preferably 11 to 13 carbon atoms and further more preferably 11 carbon atoms, and the alkyl group and alkenyl group may be any of a linear type, a branched type and a cyclic type; and $R_2$ represents a hydroxyalkyl group or a hydroxyalkyl group having an oxyalkylene unit].

[11] A method of reducing a viscosity of unvulcanized rubber, wherein at least one rubber component selected from natural rubber and/or diene base synthetic rubbers is compounded with a white filler and at least one of monoalkanolamides represented by the following Formula (I):

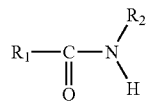
(I)

[in Formulas (I) described above, $R_1$ represents methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl, preferably heptyl, 2-ethylhexyl, nonyl, undecyl or tridecyl, more preferably undecyl or tridecyl and further more preferably undecyl; and $R_2$ is a hydroxyalkyl group or a hydroxyalkyl group having an oxyalkylene unit].

EXAMPLES

Next, the present invention shall be explained in further details with reference to production examples, examples and comparative examples, but the present invention shall by no means be restricted to the following examples.

Production Examples 1 to 5

Monoalkanolamides obtained by the following respective production methods were used.

Production Example 1

A four neck flask of 500 ml was charged with 350 g (1.63 mole) of methyl laurate and 122.6 g (1.63 mole) of 2-amino-1-propanol, and sodium methoxide of 0.05% by mass based on the mixture obtained was added and stirred at 85° C. for 7 hours under reduced pressure (45 mm Hg)/nitrogen atmosphere and removed methanol formed by the reaction. Then, sodium methoxide which was the catalyst was neutralized by an equivalent of phosphoric acid and filtrated to obtain 396 g of lauric acid monoisopropanolamide.

Production Example 2

An ethylene oxide addition equipment of 2.5 liter was charged with 900 g (3.70 mole) of AMINON C-01 (manufactured by Kao Corporation) and sodium methoxide of 0.1% by mass based thereon, and 326 g (7.40 mole) of ethylene oxide was added to AMINON C-01 at 120° C. Then, the reaction liquid was deaerated under vacuum, cooled down to 70° C. and drawn out. After that, sodium methoxide which was the catalyst was neutralized by an equivalent of phosphoric acid and filtrated to obtain 1140 g of POE (2) lauric acid monoethanolamide.

Production Example 3

The reaction was carried out in the same manner as in Production Example 1 to obtain 362 g of hexanoic acid monoethanolamide, except that in Production Example 1 described above, the ester was changed to 320 g (2.46 mole) of methyl hexanoate and that the amine was changed to 150.1 g (2.46 mole) of monoethanolamine.

Production Example 4

The reaction was carried out in the same manner as in Production Example 1 to obtain 371 g of octanoic acid monoethanolamide, except that in Production Example 1 described above, the ester was changed to 340 g (2.15 mole) of methyl octanoate and that the amine was changed to 131.2 g (2.15 mole) of monoethanolamine.

Production Example 5

The reaction was carried out in the same manner as in Production Example 1 to obtain 401 g of tetradecanoic acid monoethanolamide, except that in Production Example 1 described above the ester was changed to 380 g (1.57 mole) of methyl tetradecanoate and that the amine was changed to 95.8 g (1.57 mole) of monoethanolamine.

Examples 1 to 18 and Comparative Examples 1 to 10

Rubber compositions were prepared according to recipes shown in Table 1 to Table 5 described below by ordinary methods. Numerical values in the tables are shown by mass parts.

The respective rubber compositions thus obtained were used to measure a viscosity of unvulcanized rubber and a scorch time by the following measuring methods. The rubber compositions obtained were vulcanized at 160° C. for 14 minutes. The vulcanized rubbers obtained were used to measure a viscoelasticity (tan δ) by the following measuring method.

The results thereof are shown in Table 1 to Table 5.
Measuring Methods of a Viscosity of Unvulcanized Rubber and Scorch Time:

The viscosity of unvulcanized rubber and the scorch time were measured according to JIS K 6300-1:2001 (Mooney viscosity, Mooney scorch time).

The evaluation results thereof were shown by indices, wherein the values obtained in Comparative Examples 1, 3, 6, 8, 9 and 10 were set to 100 respectively. It is shown that the smaller the viscosity of unvulcanized rubber is, the better the workability is, and it is shown that the larger the value of the scorch time is, the more the vulcanization is delayed to start. Further, it is shown that the smaller the value of the scorch time is, the more the vulcanization is expedited to start and that rubber burning is brought about, so that it is not preferred.
Measuring Method of Viscoelasticity (tanδ):

A viscoelasticity measuring equipment (manufactured by Rheometric Corporation) was used to measure tanδ at a temperature of 50° C., a distortion of 5% and a frequency of 15 Hz, and the results thereof were shown by indices, wherein the values obtained in Comparative Examples 1, 3, 6, 8, 9 and 10 were set to 100 respectively. It is shown that the smaller the above value is, the better the low heat build-up is.

TABLE 1

|  | Comparative Example | | Example | | | | | | | |
| --- | --- | --- | --- | --- | --- | --- | --- | --- | --- | --- |
|  | 1 | 2 | 1 | 2 | 3 | 4 | 5 | 6 | 7 | 8 |
| E-SBR*1 | 137.5 | 137.5 | 137.5 | 137.5 | 137.5 | 137.5 | 137.5 | 137.5 | 137.5 | 137.5 |
| Carbon black*2 | 20 | 20 | 20 | 20 | 20 | 20 | 20 | 20 | 20 | 20 |
| Silica*3 | 80 | 80 | 80 | 80 | 80 | 80 | 80 | 80 | 80 | 80 |
| Silane coupling agent*4 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 |
| Wax*5 | 2 | 2 | 2 | 2 | 2 | 2 | 2 | 2 | 2 | 2 |
| Antioxidant 6PPD*6 | 4 | 4 | 4 | 4 | 4 | 4 | 4 | 4 | 4 | 4 |
| Antioxidant TMQ*7 | 0.3 | 0.3 | 0.3 | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 | 2.5 | 2.5 | 2.5 |
| Vulcanization accelerator DPG*8 | 0.8 | 0.8 | 0.8 | 0.8 | 0.8 | 0.8 | 0.8 | 0.8 | 0.8 | 0.8 |
| Vulcanization accelerator MBTS*9 | 0.8 | 0.8 | 0.8 | 0.8 | 0.8 | 0.8 | 0.8 | 0.8 | 0.8 | 0.8 |
| Vulcanization accelerator CBS*10 | 0.9 | 0.9 | 0.9 | 0.9 | 0.9 | 0.9 | 0.9 | 0.9 | 0.9 | 0.9 |

TABLE 1-continued

|  | Comparative Example | | Example | | | | | | | |
| --- | --- | --- | --- | --- | --- | --- | --- | --- | --- | --- |
|  | 1 | 2 | 1 | 2 | 3 | 4 | 5 | 6 | 7 | 8 |
| Sulfur | 1.5 | 1.5 | 1.5 | 1.5 | 1.5 | 1.5 | 1.5 | 1.5 | 1.5 | 1.5 |
| Tertiary amine*11 |  | 5 |  |  |  |  |  |  |  |  |
| Monoalkanolamide 1*12 |  |  | 5 |  |  |  |  |  |  |  |
| Monoalkanolamide 2*13 |  |  |  | 5 |  |  |  |  |  |  |
| Monoalkanolamide 3*14 |  |  |  |  | 1.5 | 5 | 8 |  |  |  |
| Monoalkanolamide 4*15 |  |  |  |  |  |  |  | 5 |  |  |
| Monoalkanolamide 5*16 |  |  |  |  |  |  |  |  | 5 |  |
| Monoalkanolamide 6*17 |  |  |  |  |  |  |  |  |  | 5 |
| Unvulcanization viscosity | 100 | 88 | 85 | 90 | 95 | 83 | 67 | 86 | 84 | 85 |
| Scorch time | 100 | 48 | 85 | 83 | 92 | 86 | 75 | 83 | 84 | 88 |
| tan δ | 100 | 90 | 92 | 97 | 96 | 90 | 85 | 89 | 90 | 93 |

TABLE 2

|  | Comparative Example | | Example | | | | | | Comparative |
| --- | --- | --- | --- | --- | --- | --- | --- | --- | --- |
|  | 3 | 4 | 9 | 10 | 11 | 12 | 13 | 14 | Example 5 |
| S-SBR*19 | 100 | 100 | 100 | 100 | 100 | 100 | 100 | 100 | 100 |
| Carbon black*2 | 20 | 20 | 20 | 20 | 20 | 20 | 20 | 20 | 20 |
| Silica*3 | 80 | 80 | 80 | 80 | 80 | 80 | 80 | 80 | 80 |
| Silane coupling agent*4 | 8 | 8 | 8 | 8 | 8 | 8 | 8 | 8 | 8 |
| Stearic acid | 1 | 1 | 1 | 1 | 1 | 1 | 1 | 1 | 1 |
| Wax*5 | 2 | 2 | 2 | 2 | 2 | 2 | 2 | 2 | 2 |
| Antioxidant 6PPD*6 | 4 | 4 | 4 | 4 | 4 | 4 | 4 | 4 | 4 |
| Antioxidant TMQ*7 | 0.3 | 0.3 | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 | 2.5 | 2.5 |
| Vulcanization accelerator DPG*8 | 0.8 | 0.8 | 0.8 | 0.8 | 0.8 | 0.8 | 0.8 | 0.8 | 0.8 |
| Vulcanization accelerator MBTS*9 | 0.8 | 0.8 | 0.8 | 0.8 | 0.8 | 0.8 | 0.8 | 0.8 | 0.8 |
| Vulcanization accelerator CBS*10 | 0.9 | 0.9 | 0.9 | 0.9 | 0.9 | 0.9 | 0.9 | 0.9 | 0.9 |
| Sulfur | 1.5 | 1.5 | 1.5 | 1.5 | 1.5 | 1.5 | 1.5 | 1.5 | 1.5 |
| Tertiary amine*11 |  | 5 |  |  |  |  |  |  |  |
| Monoalkanolamide 1*12 |  |  | 5 |  |  |  |  |  |  |
| Monoalkanolamide 2*13 |  |  |  | 5 |  |  |  |  |  |
| Monoalkanolamide 3*14 |  |  |  |  | 5 |  |  |  |  |
| Monoalkanolamide 4*15 |  |  |  |  |  | 5 |  |  |  |
| Monoalkanolamide 5*16 |  |  |  |  |  |  | 5 |  |  |
| Monoalkanolamide 6*17 |  |  |  |  |  |  |  | 5 |  |
| Monoalkanolamide 7*18 |  |  |  |  |  |  |  |  | 5 |
| Unvulcanization viscosity | 100 | 85 | 87 | 88 | 88 | 89 | 88 | 88 | 84 |
| Scorch time | 100 | 65 | 90 | 93 | 94 | 92 | 93 | 94 | 91 |
| tan δ | 100 | 85 | 89 | 95 | 86 | 85 | 86 | 86 | 98 |

TABLE 3

|  | Comparative Example | | Example 15 | Comparative | |
| --- | --- | --- | --- | --- | --- |
|  | 6 | 7 |  | Example 8 | Example 16 |
| S-SBR*19 | 137.5 | 137.5 | 137.5 | 137.5 | 137.5 |
| Carbon black*2 | 10 | 10 | 10 | 10 | 10 |
| Silica*3 | 100 | 100 | 100 |  |  |
| Silica*20 |  |  |  | 100 | 100 |
| Silane coupling agent*4 | 10 | 10 | 10 | 10 | 10 |
| Stearic acid | 2 | 2 | 2 | 2 | 2 |
| Zinc oxide | 3 | 3 | 3 | 3 | 3 |
| Vulcanization accelerator DPG*8 | 1 | 1 | 1 | 1 | 1 |
| Vulcanization accelerator MBTS*9 | 1 | 1 | 1 | 1 | 1 |
| Vulcanization accelerator TBBS*21 | 1 | 1 | 1 | 1 | 1 |
| Sulfur | 1.5 | 1.5 | 1.5 | 1.5 | 1.5 |
| Tertiary amine*12 |  | 2 |  |  |  |
| Monoalkanolamide 3*14 |  |  | 2 |  | 4 |
| Unvulcanization viscosity | 100 | 80 | 84 | 100 | 86 |
| Scorch time | 100 | 70 | 84 | 100 | 88 |
| tan δ | 100 | 90 | 89 | 100 | 87 |

TABLE 4

|  | Comparative Example 9 | Example 17 |
| --- | --- | --- |
| S-SBR*19 | 137.5 | 137.5 |
| Silica*3 | 40 | 40 |
| Silane coupling agent*4 | 4 | 4 |

TABLE 4-continued

|  | Comparative Example 9 | Example 17 |
|---|---|---|
| Stearic acid | 1 | 1 |
| Zinc oxide | 1 | 1 |
| Vulcanization accelerator DPG*8 | 0.4 | 0.4 |
| Vulcanization accelerator MBTS*9 | 0.4 | 0.4 |
| Vulcanization accelerator CBS*10 | 0.5 | 0.5 |
| Sulfur | 1 | 1 |
| Monoalkanol-amide 3*14 |  | 2 |
| Unvulcanization viscosity | 100 | 70 |
| Scorch time | 100 | 82 |
| tan δ | 100 | 80 |

TABLE 5

|  | Comparative Example 10 | Example 18 |
|---|---|---|
| S-SBR*19 | 96.3 | 96.3 |
| BR*22 | 30 | 30 |
| Carbon black*2 | 20 | 20 |
| Silica*3 | 85 | 85 |
| Silane coupling agent*4 | 9 | 9 |
| Stearic acid | 2 | 2 |
| Zinc oxide | 3 | 3 |
| Vulcanization accelerator DPG*8 | 1 | 1 |
| Vulcanization accelerator MBTS*9 | 1 | 1 |
| Vulcanization accelerator CBS*10 | 1 | 1 |
| Sulfur | 1.5 | 1.5 |
| Monoalkanol-amide 3*14 |  | 4 |
| Unvulcanization viscosity | 100 | 81 |
| Scorch time | 100 | 92 |
| tan δ | 100 | 84 |

*1 to *22 in Table 1 to Table 5 are shown as follows.
*1: SBR#1723 (manufactured by JSR Corporation) (rubber component: 100 parts by mass, oil component: 37.5 parts by mass)
*2: SEAST 7HM (manufactured by Tokai Carbon Co., Ltd.)
*3: Nipsil VN3 (manufactured by Tosoh Silica Corporation)
*4: Bis (3-triethoxysilylpropyl) tetrasulfide
*5: Microcrystalline wax, Ozoace 0701 (manufactured by Nippon Seiro Co., Ltd.)
*6: NOCRAC 6C (manufactured by Ouchi Shinko Industrial Co., Ltd.)
*7: NONFLEX RD-S (manufactured by Seiko Chemical Co., Ltd.)
*8: NOCCELER D (manufactured by Ouchi Shinko Industrial Co., Ltd.)
*9: NOCCELER DM (manufactured by Ouchi Shinko Industrial Co., Ltd.)
*10: Sanceler CM-G (manufactured by Sanshin Chemical Industrial Co., Ltd.)
*11: FARMIN DM8098 (dimethyistearylamine, manufactured by Kao Corporation)
*12: Compound produced in Production Example 1
*13: Compound produced in Production Example 2
*14: AMINON C-01 (lauric acid monoethanolamide, manufactured by Kao Corporation)
*15: Compound produced in Production Example 3
*16: Compound produced in Production Example 4
*17: Compound produced in Production Example 5
*18: Struktol HT-254 ( mixture of hexadecanoic acid monoethanolamide and octadecanoic acid monoethanolamide, manufactured by Struktol Company)
*19: Tufdene 2830 (manufactured by Asahi Kasei Chemicals Corporation) (rubber component: 100 parts by mass, oil component: 37.5 parts by mass)
*20: Zeosil Premium 200MP (trade name) : manufactured by Rhodia S.A.
*21: NOCCELER NS-P (manufactured by Ouchi Shinko Industrial Co., Ltd.)
*22: BR01 (manufactured by JSR Corporation)

As apparent from the results shown in Table 1 to Table 5, it has been found from the evaluation results of the viscosity of unvulcanized rubber, the scorch time and the viscoelasticity (tan δ) that the rubber compositions produced in Examples 1 to 18 falling in the scope of the present invention can be improved in heat build-up and is enhanced in processability without causing increasing a viscosity of the unvulcanized rubber and retarding a vulcanization rate thereof as compared with the rubber compositions produced in Comparative Examples 1 to 10 falling outside the scope of the present invention.

INDUSTRIAL APPLICABILITY

The rubber compositions of the present invention can be used for applications of rubber products such as rubber vibration insulators, belts and hoses as well as applications of tire members for pneumatic tires, such as tire treads, under treads, carcasses, side walls and bead parts.

The invention claimed is:
1. A rubber composition comprising a blend of at least one rubber component selected from natural rubber and/or diene base synthetic rubbers, 5 to 200 parts by mass, based on 100 parts by mass of the rubber component, of silica and/or aluminum hydroxide, and 0.5 to 15 parts by mass, based on 100 parts by mass of the rubber component, of at least one of monoalkanolamides represented by the following Formula (I), wherein a compounding amount of the monoalkanolamide represented by Formula (I) is 0.5 to 20 parts by mass based on 100 parts by mass of the silica and/or the aluminum hydroxide:

wherein in Formula (I), $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit, and
wherein the total amount of the natural rubber and/or diene base synthetic rubbers and the silica and/or aluminum hydroxide is 67.34% to 79.37% by mass based on the entire mass of the rubber composition.

2. The rubber composition as described in claim 1, wherein in Formula (I), $R_1$ is at least one selected from the group consisting of methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl or isotridecyl.

3. The rubber composition as described in claim 1, wherein in Formula (I), $R_1$ is an alkyl group or an alkenyl group having 6 to 13 carbon atoms.

4. The rubber composition as described in claim 1, wherein the silica and/or the aluminum hydroxide is present in an amount of 20 to 120 parts by mass and the at least one of monoalkanolamides represented by Formula (I) is present in an amount of 1 to 10 parts by mass, based on 100 parts by mass of the rubber component.

5. The rubber composition as described in claim 1, wherein $R_2$ in Formula (I) is represented by the following Formulas (II); $R_3$ is an alkylene group having 1 to 6 carbon atoms; and n is a number of 1 to 5:

—(R$_3$O)$_n$—H　(II).

6. The rubber composition as described in a claim 1, further comprising a silane coupling agent.

7. The rubber composition as described in claim 6, wherein the silica and/or the aluminum hydroxide is silica, and the silane coupling agent is present in an amount of 1 to 20 parts by mass based on 100 parts by mass of silica.

8. The rubber composition as described in claim 7, wherein the silica and/or the aluminum hydroxide is silica, and the silane coupling agent is present in an amount of 6 to 20 parts by mass based on 100 parts by mass of silica.

9. The rubber composition as described in claim 1, wherein the silica and/or the aluminum hydroxide is silica.

10. The rubber composition as described in claim 1, wherein the at least one of monoalkanolamides represented by Formula (I) is present in an amount of 2 to 12 parts by mass based on 100 parts by mass of the silica and/or the aluminum hydroxide.

11. The rubber composition as described in claim 1, wherein the diene base synthetic rubber is at least one selected from the group consisting of polyisoprene rubber (IR), polybutadiene rubber (BR), styrene-butadiene copolymer rubber (SBR), butyl rubber (IIR) and ethylene-propylene copolymers.

12. The rubber composition as described in claim 1, wherein the at least one of monoalkanolamides represented by Formula (I) is at least one selected from the group consisting of lauric acid monoisopropanolamide, hexanoic acid monoethanolamide, octanoic acid monoethanolamide, decanoic acid monoethanolamide, lauric acid monoethanolamide, tetradecanoic acid monoethanolamide and POE (2) lauric acid monoethanolamide.

13. A rubber composition comprising a vulcanized composition of the rubber composition as described in claim 1.

14. A tire prepared by using the rubber composition as described in claim 1 for a tire member.

15. A method of reducing a viscosity of unvulcanized rubber, wherein at least one rubber component selected from natural rubber and/or diene base synthetic rubbers is compounded with 5 to 200 parts by mass, based on 100 parts of the rubber component, of silica and/or aluminum hydroxide and 0.5 to 15 parts by mass, based on 100 parts of the rubber component, of at least one of monoalkanolamides represented by the following Formula (I), wherein a compounding amount of the monoalkanolamide represented by Formula (I) is 0.5 to 20 parts by mass based on 100 parts by mass of the silica and/or the aluminum hydroxide:

wherein in Formula (I), $R_1$ represents an alkyl group or an alkenyl group having 1 to 13 carbon atoms, and the alkyl group and alkenyl group may be any of a linear type, a branched type and a cyclic type; and $R_2$ represents a hydroxyalkyl group or a hydroxyalkyl group having an oxyalkylene unit, and wherein the total amount of the natural rubber and/or diene base synthetic rubbers and the silica and/or aluminum hydroxide is 67.34% to 79.37% by mass based on the entire mass of the rubber composition.

16. The method of reducing a viscosity of unvulcanized rubber as described in claim 15, wherein in Formula (I), $R_1$ is at least one selected from the group consisting of methyl, ethyl, propyl, isopropyl, butyl, isobutyl, t-butyl, pentyl, isopentyl, hexyl, isoheptyl, 2-ethylhexyl, octyl, nonyl, isononyl, decyl, undecyl, dodecyl, tridecyl and isotridecyl.

17. The method of reducing a viscosity of unvulcanized rubber as described in claim 15, wherein in Formula (I), $R_1$ is an alkyl group or an alkenyl group having 6 to 13 carbon atoms.

* * * * *